United States Patent [19]

Walls et al.

[11] Patent Number: 6,066,279
[45] Date of Patent: May 23, 2000

[54] GELCASTING METHODS

[75] Inventors: Claudia A. Walls, Oak Ridge; Glen H. Kirby, Knoxville; Mark A. Janney, Knoxville; Ogbemi O. Omatete, Knoxville; Stephen D. Nunn, Knoxville; April D. McMillan, Knoxville, all of Tenn.

[73] Assignee: Lockheed Martin Energy Research Corp., Oak Ridge, Tenn.

[21] Appl. No.: 09/135,500

[22] Filed: Aug. 17, 1998

Related U.S. Application Data

[63] Continuation-in-part of application No. 08/931,809, Sep. 16, 1997, abandoned.

[51] Int. Cl.$^7$ .................................................. C04B 35/634
[52] U.S. Cl. ...................... 264/118; 264/109; 264/119; 264/670; 264/678; 419/36; 419/37; 419/65
[58] Field of Search .................................. 264/109, 670, 264/678, 118, 119; 419/36, 37, 65

[56] References Cited

U.S. PATENT DOCUMENTS

| | | |
|---|---|---|
| 2,939,199 | 6/1960 | Strivens . |
| 3,351,688 | 11/1967 | Kingery et al. . |
| 4,011,291 | 3/1977 | Curry . |
| 4,113,480 | 9/1978 | Rivers . |
| 4,144,297 | 3/1979 | Tomar . |
| 4,197,118 | 4/1980 | Wiech . |
| 4,460,527 | 7/1984 | Kato . |
| 4,478,790 | 10/1984 | Hurther et al. . |
| 4,609,527 | 9/1986 | Rinderle ................................. 264/655 |
| 4,894,194 | 1/1990 | Janney . |
| 4,906,424 | 3/1990 | Hughes ..................................... 419/36 |
| 5,028,362 | 7/1991 | Janney et al. . |
| 5,145,908 | 9/1992 | Janney .................................... 264/109 |
| 5,294,264 | 3/1994 | Tiegs et al. . |
| 5,358,051 | 10/1994 | Rodrigues ............................... 166/295 |
| 5,401,445 | 3/1995 | Menchhofer . |
| 5,419,860 | 5/1995 | Menchhofer ............................ 264/109 |
| 5,456,877 | 10/1995 | Tiegs et al. . |
| 5,476,622 | 12/1995 | Moorhead et al. . |

OTHER PUBLICATIONS

O. O. Omatete, A. C. Young, M. A. Janney, and J. H. Adair, "Investigation of Dilute Gelcasting Alumina Suspension", *Am. Ceram. Soc.*, Ceramic Trans. vol. 12–Ceramic Powder Science III, pp. 537–544, (1990).

O. O. Omatete, R. A. Strehlow, and B. L. Armstrong, "Forming of Silicon Nitride by Gelcasting," in pp. 245–251 in *Proceedings of the Annual Automotive Tech. Dev. Contractor's Coordination Meeting*, P–243, SAE, Warrendale, PA (1991).

A. C. Young, O. O. Omatete, M. A. Janney, and P.A. Menchofer, "Gelcasting of Alumina," *J. Am. Ceram. Soc. Bull.*, 74 [3] 612–18 (1991).

O. O. Omatete, M.A. Janney, and R.A. Strehhow, "Gelcasting—A New Ceramic Forming Process", *Am. Ceram. Soc. Bull.*, 74 [10] 1641–49 (1991).

O. O. Omatete, T. N. Tiegs, and A.C. Young, "Gelcasting Reaction—Bonded Silicon Nitride Composites," *Ceram. Eng. Sci. Proc.*, 12 [7–8] 1257–64 (1991) .

O. O. Omatete, A. Bleier, C. G. Westmoreland, and A.C. Young, "Gelcasting Zirconia–Alumina Composites," *Ceram. Eng. Sci. Proc.*, 12 [9–10] 2084–94 (1991).

O. O. Omatete, R. A. Strehlow and C.A. Walls, "Gelcasting of Submicron Alumina, SiAlON, and Silicon Nitride Powders," 37th Army Sagamore Conference Proceedings, pp. 201–212, Plymouth, Mass. (Oct. 1991).

O. O. Omatete, R. A. Strehhow, and C. A. Walls, "Drying of Gelcast Ceramics", *Trans. Am. Ceram. Soc.*, 26 101–107 (1992).

A. Bleier, O. O. Omatete, and C. G. Westmoreland, "Rheology of Zirconia–Alumina Gelcasting Slurries," *Mat. Res. Soc. Symp. Proc.*, 271 269–275 (1992).

A. Bleier, O. O. Omatete, and C. G. Westmoreland, "Rheology and Microstructure of Concentrated Zirconia–Alumina Suspensions for Gelcasting Composites", *Mat. Res. Soc. Symp. Proc.*, 289 109–115 (1993).

O. O. Omatete and A. Bleier, "Tayloring Suspension Flow for the Gelcasting of Oxide Nonoxide Ceramics," *Mat. Res. Soc. Symp. Proc.*, 346 357–363 (1994).

O. O. Omatete and A. Bleier, "Evaluation of Dispersants for Gelcasting Alumina," im *Dispersion and Aggregation: Fundamentals and Applications*, B. M. Moudgil and P. Somasundaran, ed., Engineering Foundations, N.Y. (1994), pp. 269–278.

S. D. Nunn, O. O. Omatete, C. A. Walls, and D. L. Barker, "Tensile Strength of Dried Gelcast Green Bodies," *Ceram. Eng. Sci. Proc.*, 15 [4] 493–498 (1994).

J.O. Kiggans, Jr., S. D. Nunn, T. N. Tiegs, C. C. Davisson, D. W. Coffey, and J–P Maria, "Gelcasting of Silicon Preforms for the Production of Sintered Reaction–Bonded Silicon Nitride," *P/M in Aerospace Defense and Demanding Applications*—1995, F. H. Froes, ed., Metal Power Industries Federation, Princeton, N.J. 1995, pp. 157–164.

J–P Maria, J. O. Kiggans, Jr., T. N. Tiegs, and S.D. Nunn, "Gelcasting of Sintered Reaction–Bonded Silicon Nitride for Improved Mechanical Properties," *Ceram. Eng. Sci. Proc.*, 16 [5] 1071–76 (1995).

Mark A. Janney, "Gelcasting Superalloy Powders," P/M in Aerospace, Defense and Demanding Applications—1995, F. H. Froes, ed., Metal Powder Industries Federation, Princeton, N.J. 1995, pp. 139–146.

S. D. Nunn, J. O. Kiggans, Jr., R. E. Simpson, II, and J–P Maria, "Gelcasting of Silicon Compositions for SRBSN," *Ceram. Trans.*, 62 255–262 (1996).

S. D. Nunn and G. H. Kirby, "Green Machining of Gelcast Ceramic Materials," Ceram. Eng. Sci. Proc., 17 [3] 209–213 (1996).

O. O. Omatete, M. A. Janney and S. D. Nunn, "Gelcasting: From Laboratory Development Toward Industrial Production," *J. European Ceram. Soc.* 17 407–413 (1997).

*Encyclopedia of Polymer Science and Engineering*, 1987, John Wiley & Sons, "Hydrogels," pp. 782–806.

*Primary Examiner*—James Derrington
*Attorney, Agent, or Firm*—Quarles & Braky LLP

[57] ABSTRACT

A method of gelcasting includes the steps of providing a solution of at least hydroxymethylacrylamide (HMAM) and water. At least one inorganic powder is added to the mixture. At least one initiator system is provided to polymerize the HMAM. The initiator polymerizes the HMAM and water, to form a firm hydrogel that contains the inorganic powder. One or more comonomers can be polymerized with the HMAM monomer, to alter the final properties of the gelcast material. Additionally, one or more additives can be included in the polymerization mixture, to alter the properties of the gelcast material.

16 Claims, 5 Drawing Sheets

Table 1. HMAM gels with comonomers

| Sample | Water (g) | Monomer conc. (Wt %) | Comonomer Type† | Comonomer Wt (g) | HMAM (g) | Ratio (Comono/HMAM) | Temp (°C) | Atmosphere (Ambient unless noted) | Gel (1 hour) | Over-Night Gel |
|---|---|---|---|---|---|---|---|---|---|---|
| 1 | 15.63 | 3% | — | 0 | 1.04 | 0:1 | room | | Yes | |
| 2 | 15.63 | 3% | — | 0 | 1.04 | 0:1 | 60 | | Yes | |
| 3 | 15.63 | 3% | — | 0 | 1.04 | 0:1 | 90 | | Yes | |
| 4 | 14.93 | 5% | — | 0 | 1.74 | 0:1 | room | | Yes | |
| 5 | 14.93 | 5% | — | 0 | 1.74 | 0:1 | 60 | | Yes | |
| 6 | 14.93 | 5% | — | 0 | 1.74 | 0:1 | 90 | | Yes | |
| 7 | 9.72 | 20% | — | 0 | 6.94 | 0:1 | room | | Yes | |
| 8 | 9.72 | 20% | — | 0 | 6.94 | 0:1 | 60 | | Yes | |
| 9 | 9.72 | 20% | — | 0 | 6.94 | 0:1 | 90 | | Yes | |
| 10 | 12.13 | 20% | AA | 2.22 | 2.31 | 2:1 | room | | No | |
| 11 | 12.13 | 20% | AA | 2.22 | 2.31 | 2:1 | 60 | | Yes | |
| 12 | 12.13 | 20% | AA | 2.22 | 2.31 | 2:1 | 90 | | Yes | |
| 13 | 12.61 | 20% | AA | 2.67 | 1.39 | 4:1 | room | | No | |
| 14 | 12.61 | 20% | AA | 2.67 | 1.39 | 4:1 | 60 | vacuum | No | |
| 15 | 12.61 | 20% | AA | 2.67 | 1.39 | 4:1 | 90 | | Yes | |
| 16 | 13.01 | 20% | AA | 3.03 | 0.63 | 10:1 | room | | No | |
| 17 | 13.01 | 20% | AA | 3.03 | 0.63 | 10:1 | 60 | | Partial | Yes |
| 18 | 13.01 | 20% | AA | 3.03 | 0.63 | 10:1 | 90 | | Yes | |
| 20 | 12.13 | 20% | MAA | 2.22 | 2.31 | 2:1 | 60 | | No | |
| 21 | 12.13 | 20% | MAA | 2.22 | 2.31 | 2:1 | 90 | | Yes | |
| 22 | 12.61 | 20% | MAA | 2.67 | 1.39 | 4:1 | room | | No | |
| 23 | 12.61 | 20% | MAA | 2.67 | 1.39 | 4:1 | 60 | vacuum | No | |
| 24 | 12.61 | 20% | MAA | 2.67 | 1.39 | 4:1 | 90 | | Yes | |

*FIG. 1(A)*

| Sample | Water (g) | Monomer conc. (Wt %) | Comonomer Typ | Comonomer Wt (g) | HMAM (g) | Ratio (Comono/HMAM) | Temp (°C) | Atmosphere (Ambient unless noted) | Gel (1 hour) | Overnight Gel |
|---|---|---|---|---|---|---|---|---|---|---|
| 25 | 13.01 | 20% | MAA | 3.03 | 0.63 | 10:1 | room | | No | |
| 26 | 13.01 | 20% | MAA | 3.03 | 0.63 | 10:1 | 60 | | No | |
| 27 | 13.01 | 20% | MAA | 3.03 | 0.63 | 10:1 | 90 | | Yes | |
| 28 | 12.13 | 20% | MAM | 2.22 | 2.31 | 2:1 | room | | Yes | |
| 29 | 12.13 | 20% | MAM | 2.22 | 2.31 | 2:1 | 60 | | Yes | |
| 30 | 12.13 | 20% | MAM | 2.22 | 2.31 | 2:1 | 90 | | Yes | |
| 31 | 12.61 | 20% | MAM | 2.67 | 1.39 | 4:1 | room | | "Yes, Weak" | |
| 32 | 12.61 | 20% | MAM | 2.67 | 1.39 | 4:1 | 60 | vacuum | "Yes, Weak" | |
| 33 | 12.61 | 20% | MAM | 2.67 | 1.39 | 4:1 | 90 | | Yes | |
| 34 | 13.01 | 20% | MAM | 3.03 | 0.63 | 10:1 | room | | "No, Viscous" | Yes |
| 35 | 13.01 | 20% | MAM | 3.03 | 0.63 | 10:1 | 60 | | "No, Viscous" | |
| 36 | 13.01 | 20% | MAM | 3.03 | 0.63 | 10:1 | 90 | | "No, Viscous" | |
| 37 | 12.13 | 20% | NVP | 2.22 | 2.31 | 2:1 | room | | Yes | |
| 38 | 12.13 | 20% | NVP | 2.22 | 2.31 | 2:1 | 60 | | Yes | |
| 39 | 12.13 | 20% | NVP | 2.22 | 2.31 | 2:1 | 90 | | Yes | |
| 40 | 12.61 | 20% | NVP | 2.67 | 1.39 | 4:1 | room | | Yes | |
| 41 | 12.61 | 20% | NVP | 2.67 | 1.39 | 4:1 | 60 | vacuum | Yes | |
| 42 | 12.61 | 20% | NVP | 2.67 | 1.39 | 4:1 | 90 | | Yes | |
| 43 | 13.01 | 20% | NVP | 3.03 | 0.63 | 10:1 | room | | No | |
| 44 | 13.01 | 20% | NVP | 3.03 | 0.63 | 10:1 | 60 | | No | |
| 45 | 13.01 | 20% | NVP | 3.03 | 0.63 | 10:1 | 90 | | No | |

*FIG. 1(B)*

| Sample | Water (g) | Monomer conc. (Wt %) | Comonomer Type | Comonomer Wt (g) | HMAM (g) | Ratio (Comono/HMAM) | Temp (°C) | Atmosphere (Ambient unless noted) | Gel (1 hour) | Overnight Gel |
|---|---|---|---|---|---|---|---|---|---|---|
| 46 | 12.13 | 20% | MPEGMA | 2.22 | 2.31 | 2:1 | room | | Yes | |
| 47 | 12.13 | 20% | MPEGMA | 2.22 | 2.31 | 2:1 | 60 | | Yes | |
| 48 | 12.13 | 20% | MPEGMA | 2.22 | 2.31 | 2:1 | 90 | | Yes | |
| 49 | 12.61 | 20% | MPEGMA | 2.67 | 1.39 | 4:1 | room | | Yes | |
| 50 | 12.61 | 20% | MPEGMA | 2.67 | 1.39 | 4:1 | 60 | vacuum | Yes | |
| 51 | 12.61 | 20% | MPEGMA | 2.67 | 1.39 | 4:1 | 90 | | Yes | |
| 52 | 13.01 | 20% | MPEGMA | 3.03 | 0.63 | 10:1 | room | | "Yes, Weak" | |
| 53 | 13.01 | 20% | MPEGMA | 3.03 | 0.63 | 10:1 | 60 | | "Yes, Weak" | |
| 54 | 13.01 | 20% | MPEGMA | 3.03 | 0.63 | 10:1 | 90 | vacuum | "Yes, Weak" | |
| 55 | 16.32 | 1% | — | 0 | 0.35 | 0:1 | room | | No | |
| 56 | 16.32 | 1% | — | 0 | 0.35 | 0:1 | 60 | | No | |
| 57 | 16.32 | 1% | — | 0 | 0.35 | 0:1 | 90 | vacuum | No | |
| 58 | 16.41 | 1% | MAM | 0.08 | 0.17 | 1:1 | room | | No | |
| 59 | 16.41 | 1% | MAM | 0.08 | 0.17 | 1:1 | 60 | | No | |
| 60 | 16.41 | 1% | MAM | 0.08 | 0.17 | 1:1 | 90 | vacuum | Yes | |
| 61 | 0 | 75% | AA | 8.65 | 8.01 | 2.25:1 | room | | No | |
| 62 | 0 | 75% | AA | 8.65 | 8.01 | 2.25:1 | 60 | | No | |
| 63 | 0 | 75% | AA | 8.65 | 8.01 | 2.25:1 | 90 | vacuum | Yes | |
| 64 | 0.72 | 75% | NVP | 9.38 | 6.58 | 3:1 | room | | Yes | |
| 65 | 0.72 | 75% | NVP | 9.38 | 6.58 | 3:1 | 60 | | Yes | |
| 66 | 0.72 | 75% | NVP | 9.38 | 6.58 | 3:1 | 90 | vacuum | Yes | |

*FIG. 1(C)*

Table 2. HMAM with two comonomers

| Sample | Water (g) | Total. (wt %) | Comonomer #1 | Weight (g) | Comonomer #2 | Weight (g) | HMAM (g) | Ratio Co1 : Co 2 : HMAM | Temp (°C) | GEL |
|---|---|---|---|---|---|---|---|---|---|---|
| 67 | 30.97 | 20% | NVP | 0.83 | MPEGMA | 0.83 | 17.36 | 1:1:10 | room | Yes |
| 68 | 30.97 | 20% | NVP | 0.83 | MPEGMA | 0.83 | 17.36 | 1:1:10 | 60 | Yes |
| 69 | 30.97 | 20% | NVP | 0.83 | MPEGMA | 0.83 | 17.36 | 1:1:10 | 90 | Yes |
| 70 | 30.97 | 20% | AA | 0.83 | MAA | 0.83 | 17.36 | 1:1:10 | room | No |
| 71 | 30.97 | 20% | AA | 0.83 | MAA | 0.83 | 17.36 | 1:1:10 | 60 | Yes |
| 72 | 30.97 | 20% | AA | 0.83 | MAA | 0.83 | 17.36 | 1:1:10 | 90 | Yes |

FIG. 2

Table 3. Web Test Results

| Ceramic Powder | Monomer System | Additive | 100% Survival Thickness (Mils) | Partial Survival Thickness (Mils) |
|---|---|---|---|---|
| 50 vol% Sialon | MAM/MBAM/NVPN | None | 30 | 20 |
| 55 vol% RCHP-DBM Al2O3 | MAM/MBAM | None | 30 | 20 |
| 55 vol% RCHP-DBM Al2O3 | MAM/MBAM | 8.3% PEG400 | 30 | - |
| 55 vol% RCHP-DBM Al2O3 | 15% MAM/PEGDMA 1000 3:1 | None | 20 | - |
| 55 vol% RCHP-DBM Al2O3 | 15% MAM/PEGDMA 1000 3:1 | 15% PEG400 | 20 | 10 |
| 55 vol% RCHP-DBM Al2O3 | 15% MAM/PEGDMA 1000 3:1 | 15% Glycerin | 20 | - |
| 55 vol% RCHP-DBM Al2O3 | 15% MAM/PEGDMA 1000 3:1 | 15% Tween | 20 | - |
| 55 vol% RCHP-DBM Al2O3 | 20% HMAM | None | 20 | - |
| 55 vol% RCHP-DBM Al2O3 | 20% HMAM | 15% PEG400 | 10 | 6 |
| 55 vol% RCHP-DBM Al2O3 | 20% HMAM | 15% Glycerin | 20 | 9 |
| 55 vol% RCHP-DBM Al2O3 | 20% HMAM | 15% Tween | 20 | - |
| 45 vol% UBE E05 Si3N4 | 15% MAM/PEGDMA 1000 3:1 | None | 10 | - |
| 45 vol% UBE E05 Si3N4 | 15% MAM/PEGDMA 1000 3:1 | 15% PEG400 | 10 | - |
| 45 vol% UBE E05 Si3N4 | 15% MAM/PEGDMA 1000 3:1 | 15% Glycerin | 20 | 10 |
| 45 vol% UBE E05 Si3N4 | 15% MAM/PEGDMA 1000 3:1 | 15% Tween | 20 | 10 |
| 45 vol% UBE E05 Si3N4 | 20% HMAM | None | 20 | 8 |
| 45 vol% UBE E05 Si3N4 | 20% HMAM | 15% PEG400 | 10 | 6 |
| 45 vol% UBE E05 Si3N4 | 20% HMAM | 15% Glycerin | 20 | 6 |
| 45 vol% UBE E05 Si3N4 | 20% HMAM | 15% Tween | 20 | - |
| 45 vol% TZ8YS ZrO2 | 20% HMAM | None | 6 | 3 |
| 45 vol% TZ8YS ZrO2 | 20% HMAM | 15% PEG400 | 8 | - |
| 45 vol% TZ8YS ZrO2 | 20% HMAM | 15% Glycerin | 20 | 9 |
| 45 vol% TZ8YS ZrO2 | 20% HMAM | 15% Tween | 3 | - |
| 45 vol% ZnO | 15% MAM/PEGDMA 1000 3:1 | None | 6 | - |
| 45 vol% ZnO | 20% HMAM | None | 10 | - |

*FIG. 3*

GELCASTING METHODS

This application is a continuation-in-part (CIP) of non-provisional patent application Ser. No. 08/931,809, filed Sep. 16, 1997, now abandoned.

This invention was made with government support under contract DE-AC0596OR22464, awarded by the United States Department of Energy to Lockheed Martin Energy Research Corporation, and the United States Government has certain rights in this invention.

FIELD OF THE INVENTION

This invention relates generally to gelcasting, and more particularly to improved gelcasting compositions and methods.

BACKGROUND OF THE INVENTION

Polymers have been demonstrated to have utility in methods of forming complex or intricately shaped parts from ceramic powders. The forming of ceramics is important because machining ceramics into complex shapes is time consuming and expensive, and in many cases impractical. Strivens, U.S. Pat. No. 2,939,199, discloses a method of forming articles from ceramic powders wherein the ceramic powders are mixed with a vehicle comprising a thermosetting material and a plasticizer, and the resultant mixture is injection molded into a mold of a desired shape and heated to cure the thermosetting component. The vehicle is then removed from the molded part by low pressure distillation or by solvent extraction. Kingery et al., U.S. Pat. No. 3,351,688, discloses a method wherein the ceramic powder is mixed with a binder such as paraffin at a temperature where the binder is liquid, and the resulting mixture is cast into a mold of the desired shape. The binder is permitted to solidify so that a green piece is formed having a uniform density. Curry, U.S. Pat. No. 4,011,291, and Ohnsorg, U.S. Pat. No. 4,144,297, disclose the use of a paraffin wax binder for molding ceramic powders into desired shapes. Rivers, U.S. Pat. No. 4,113,480, and Wiech, Jr., U.S. Pat. No. 4,197,118, disclose methods for molding parts from metal powders by mixing the powders with binder materials and injection molding the resultant mixtures. Additional methods which employ binder materials are disclosed by Hurther et al., U.S. Pat. No. 4,478,790, and Kato, U.S. Pat. No. 4,460,527.

It is known that gelcasting can also be a useful way of forming ceramic materials. Gelcasting is a method of molding ceramic powders into green products wherein a monomer solution is used as a binder vehicle and the controlled polymerization of the monomer in solution serves as a setting mechanism. The resulting green product is of exceptionally high strength and may be dried to remove water. After drying, the product may be further heated to remove the polymer and may also subsequently be fired to sinter the product to a high density. Gelcasting methods are disclosed in Janney, U.S. Pat. No. 4,894,194, Janney et al, U.S. Pat. No. 5,028,362, and Janney et al., U.S. Pat. No. 5,145,908. Gelcasting of ceramics such as alumina is described by A. C. Young, O. O. Omatete, M. A. Janney, and P. A. Menchhofer, "Gelcasting of Alumina," *J. Am. Ceram. Soc.*, 74 [3] 612–18 (1991). Mark A. Janney, Weiju Ren, Glen H. Kirby, Stephen D. Nunn, and Srinath Viswanathan, "Gelcast Tooling: Net Shape Casting and Green Machining," *Materials and Manufacturing Processes*, 1997 describe the use of a water-based gelcasting system to form parts using H13 tool steel powder. R. Raman, M. A. Janney, and S. Sastri, "An Innovative Processing Approach to Fabricating Fully Dense, Near-Net-Shape Advanced Material Parts," Advances in Powder Metallurgy and Particulate Materials, 1996, Metals Powder Industries Federation, Princeton, N.J., 1996 describe the use of a water-based gelcasting system to form parts using an 83/17 aluminum/silicon alloy powder. S. D. Nunn, J. O. Kiggans, Jr., R. E. Simpson, II, and J-P Maria, "Gelcasting of Silicon Compositions for SRBSN," Ceram. trans., 62, 255–62 (1996) describe the use of an alcohol-based gelcasting system and a water-based gelcasting system to form parts using silicon powder. M. A. Janney, "Gelcasting Superalloy Powders," in P/M in Aerospace, Defense and Demanding Applications—1995, Metals Powder Industries Federation, Princeton, N.J., 1995, describes the use of a water-based gelcasting system to form parts. The disclosures of these references are incorporated fully by reference.

Gelcast ceramic bodies have been demonstrated to be machinable in the "green" state, after drying and before firing. See S. D. Nunn, O. O. Omatete, C. A. Walls, and D. L. Barker, "Tensile Strength of Dried Gelcast Green Bodies," *Ceram. Eng. Sci. Proc.*, 15 [4] 493–498 (1994), and S. D. Nunn and G. H. Kirby, "Green Machining of Gelcast Ceramic Materials," *Ceram. Eng. Sci. Proc.*, 17 [3–4] (1996).

Hydrogels comprise a three-dimensional polymer network and water. Polymers in hydrogels are characterized by hydrophilicity and insolubility in water. The presence of water-solubilizing groups, such as —OH, —COOH, —$CONH_2$, —CONH—, —$SO_3H$ and the like, render the polymer hydrophilic. The three-dimensional polymer network creates the stability and insolubility of the hydrogel. In the presence of water, the hydrogel will swell to an equilibrium volume, which results from the balance between the disbursing forces acting on hydrated chains and cohesive forces that do not prevent the penetration of water into the network. The cohesive forces may be due to covalent cross-linking, as well as electrostatic, hydrophobic, or dipole-dipole interactions. The tacticity and crystallinity of the polymer, and the degree and nature of cross-linking, are responsible for the characteristics of the hydrogel in the swollen state.

Hydrogels for use in gelcasting are typically formed by co-polymerizing a monomer with a cross-linking agent. The monomer is typically monofunctional and the cross-linking agent is multifunctional, the functional group typically being vinyl or allyl. Typical monomers include acrylamide, methacrylamide, N-vinyl pyrrolidone, hydroxyalkyl methacrylates, hydroxyalkyl acrylates, acrylic acid and methacrylic acid. Combinations of monomers are also utilized. Cross-linking agents include methylene bisacrylamide, and diacrylates and dimethacrylates. Combinations of cross-linking agents are also utilized. The chemistry for forming hydrogels requires initiators to polymerize the system. The acrylamide and methacrylamide monomers are solids, and time is required to dissolve these solids. The cross-linking agents are also slow to dissolve, and are higher-cost components compared to the monomers.

SUMMARY OF THE INVENTION

It is an object of this invention to provide gelcasting compositions, and methods of gelcasting, which do not require a cross-linking agent.

It is another object of this invention to provide gelcasting compositions which are less costly to produce.

It is another object of this invention to provide methods of gelcasting which are less time consuming.

It is another object of this invention to provide gelcasting compositions having improved mold release characteristics in an unfired state.

It is another object of this invention to provide gelcasting compositions for constructing gelcast bodies having improved machinability characteristics in an unfired state.

It is another object of this invention to provide gelcasting compositions having improved solids loading and dispersion characteristics.

These and other objects are accomplished by a method of gelcasting in which a mixture of hydroxymethylacrylamide (HMAM), an aqueous solvent, and an inorganic powder are provided. The HMAM is polymerized in the aqueous solvent by addition polymerization, without the presence of a cross-linking agent. One or more comonomers, preferably selected from vinyl or allyl monomers, can be added to the HMAM solution to alter the properties of the gelcast composition as desired. A monomer (HMAM and any comonomer) solution of between about 5 wt. % and about 40 wt. %, based on the weight of the total solution, is preferably provided. An initiator is added and the polymerization is conducted to produce a hydrogel which is firm and has good gel characteristics. Dispersants and other processing aides to control flow properties during casting can also be included. Additives can be provided in the HMAM monomer mixture to alter the properties of the final hydrogel.

The solid product so formed can be further processed at a temperature and pressure and for a time sufficient to substantially remove the solvent from the solid product. An additional step can be performed after the removal of the solvent whereby the solid product is treated at a temperature and for a time sufficient to substantially remove the polymer from the solid product. Finally, after the polymer-removal step, the solid product can be thermally processed at a temperature sufficient to substantially permanently bond the inorganic particles together.

The invention also provides new gelcasting compositions which comprise polymerized HMAM, an inorganic powder, and without the presence of a cross-linking agent. These gelcasting compositions may include one or more comonomers, as well as dispersants and additives to alter the characteristics of the final gelcast composition.

BRIEF DESCRIPTION OF THE DRAWINGS

FIGS. (1A), (1B) and (1C) are a table of experimental results for HMAM gel formation with different comonomers.

FIG. 2 is a table of experimental results for HMAM gel formation using two comonomers.

FIG. 3 is table of experimental data comparing machinability characteristics of HMAM formulations of the present invention with machinability characteristics of conventional gelcasting formulations.

DETAILED DESCRIPTION OF THE PREFERRED EMBODIMENTS

Gelcasting compositions according to the invention comprise HMAM, water, an inorganic powder, and an initiator for the polymerization of HMAM. One or more comonomers can be added to the monomer solution. The total monomer concentration, including HMAM and any comonomer, is preferably between about 5 wt. % and about 40 wt. %, based on the weight of the total solution. The ratio of comonomer to HMAM is preferably between about 0:1 and about 10:1.

In general, the comonomer preferably has vinyl or allyl functionality, and most preferably has acrylate, acrylamide, or acrylic functionality. The comonomers can be selected from acrylic acid; methacrylamide; methacrylic acid; methoxy (polyethylene glycol) monomethacrylate; n-vinyl pyrrollidone; acrylamide; alkyl-acrylamides; alkyl-methacrylamides; alkyl-acrylates; alkyl-methacrylates; dimethyl aminoethyl methacrylate; dimethyl aminopropyl methacrylamide; hydroxy-alkyl acrylamides; hydroxy-alkyl methacrylamides; hydroxy-alkyl acrylates; hydroxy-alkyl methacrylates; methacrylatoethyl trimethyl ammonium chloride; methacrylamidopropyl trimethyl ammonium chloride; p-styrene sulfonic acid; and p-styrene sulfonic acid salts. Mixtures of comonomers are also possible. Examples of suitable comonomers are listed in below, although others are possible:

WATER-SOLUBLE MONOMERS FOR USE AS COMONOMERS WITH HMAM

| Monomer | Abbreviation | Functionality |
| --- | --- | --- |
| Acrylic acid | AA | Acrylate |
| Dimethyl aminoethyl methacrylate | DMAEMA | Acrylate |
| Dimethyl aminopropyl methacrylamide | DMAPMAM | Acrylamide |
| Hydroxyethyl acrylate | HEA | Acrylate |
| Hydroxyethyl methacrylate | HEMA | Acrylate |
| Hydroxypropyl acrylate | HPA | Acrylate |
| Hydroxypropyl methacrylate | HPMA | Acrylate |
| Isopropyl acrylamide | IPAM | Acrylamide |
| Methoxy poly(ethylene glycol) monomethacrylate | MPEGMA | Acrylate |
| Methacrylamide | MAM | Acrylamide |
| Methacrylatoethyl trimethyl ammonium chloride | MAETAC | Acrylate |
| Methacrylamidopropyl trimethyl ammonium chloride | MAPTAC | Acrylate |
| Methacrylic acid | MAA | Acrylic |
| p-Styrene sulfonic acid sodium salt | SSA | Vinyl |
| Poly(ethylene glycol) monomethacrylate | PEGMA | Acrylate |
| N-vinyl pyrrollidone | NVP | Vinyl |

The invention also has applications in both ceramic and metallic systems. Suitable ceramic powders include alumina, silica, zirconia, magnesia, chromium oxide, iron oxide, zinc oxide, hydroxylapatite, silicon nitride, silicon carbide, boron nitride, refractory carbides (such as TiC, TaC, and the like), refractory nitrides (such as TiN, TaN, WN, and the like), refractory borides (such as $TiB_2$, $ZrB_2$, and the like), clays, spinels, mullite, ferrites, titanates, glass frits, and mixtures thereof.

Suitable metal powders include steels, aluminum alloys, superalloys, titanium alloys, copper alloys, and mixtures thereof.

The ceramic or metal powder is typically incorporated at a volume fraction solids in the range of about 10% to about 80% vol %. The very wide range of solids loading useful in gelcasting is directly dependent on the nature of the ceramic or metal powder one is using. For example, a very low solids loading (on the order of 10 vol %) is achievable if one chooses to gelcast a fumed silica powder. These powders have extremely high surface area, extremely small particle size, and do not pack very efficiently. For such a powder, a flowable suspension can be achieved only at a low solids loading. At the opposite extreme is the case of refractory ceramic mixes, in which the particle size of the mix ranges broadly from several micrometers to several millimeters. Flowable suspensions can be made in such a system at solids loadings as high as 80 vol % solids, or even higher in some cases. Many of the common ceramics (e.g. whitewares, alumina, mullite, zirconia, silicon nitride, silicon carbide)

can often be used in a middle range of solids loading, i.e., between about 40 and 65 vol % solids.

The inorganic powder is typically mixed with a dispersant for the powder and the HMAM solution to form a slurry mixture. The HMAM monomer solution provides a low viscosity vehicle for the inorganic powder. Additionally, when heated, the monomer solution polymerizes and gels to form a firm, strong polymer/solvent gel matrix. The gel matrix immobilizes the inorganic in the desired shape of the mold in which the slurry mixture is heated.

An initiator is added for the addition polymerization. The initiator is preferably a free-radical initiator. Suitable free-radical initiators include: ammonium persulfate; ammonium persulfate and tetramethylethylenediamine mixtures; sodium persulfate; sodium persulfate and tetramethylethylenediamine mixtures; potassium persulfate; potassium persulfate and tetramethylethylenediamine mixtures; azobis [2-(2-imidazolin-2-yl) propane] HCl (AZIP); and azobis (2-amidinopropane) HCl (AZAP); 4,4'-azo-bis-4-cyanopentanoic acid; azobisisobutyramide; azobisisobutyramidine.2HCl; 2-2'-azo-bis-2-(methylcarboxy) propane; 2-hydroxy-1-[4-(hydroxyethoxy) phenyl]-2-methyl-1-propanone; and 2-hydroxy-2-methyl-1-phenyl-1-propanone. Mixtures of initiators are possible. Some additives or comonomers can also initiate polymerization, in which case a separate initiator may not be necessary. The initiator should control the reaction in addition to initiating it. Some sources of free-radicals result in an uncontrolled reaction, and would be generally unsuitable to serve as initiators. The initiator is preferably provided in amounts between about 0.005 wt. % and about 0.5 wt. %, based on the weight of the total solution.

Other initiator systems, in addition to free-radical initiator systems, could also be suitable. These include ultraviolet (UV), x-ray, γ-ray, electron beam, or other forms of radiation which could serve as suitable polymerization initiators.

Dispersants, flocculants, and suspending agents are added to gelcasting suspensions to control the flow behavior of the suspension. Dispersants make the suspension flow more readily; flocculants make the suspension flow less readily; suspending agents prevent particles from settling out of suspension. These additives are typically incorporated at about 0.01 to about 10 wt % of the ceramic or metal powder in the suspension.

Various dispersants for inorganic powders are known in the art and are appropriate for use in the present invention. Care should be exercised, however, in order to select a dispersant which does not interact with the components of the monomer solution, particularly the initiator. A particular dispersant may be evaluated for suitability with a particular inorganic powder and a particular monomer solution by mixing small amounts of the respective components and judging the flow properties of the resultant mixture, whether the resultant mixture exhibits a notable yield point, and/or whether the mixture is dilatant. Suitable dispersants include inorganic acids, inorganic bases, organic acids, organic bases, poly (acrylic acid), salts of poly(acrylic acid), poly (methacrylic acid), salts of poly(methacrylic acid), copolymers of poly (acrylic acid), salts of copolymers of poly (acrylic acid), copolymers of poly (methacrylic acid), salts of copolymers of poly(methacrylic acid), poly (ethylene imine), polyvinylpyrrolidone, polyacrylamide, lignosulfonates, poly (ethylene oxide), adducts of ethylene oxide, adducts of propylene oxide, polycarboxylates, salts of polycarboxylates, naphthalene sulfonates, sulfosuccinates, polyphosphates, sodium silicates, phosphate esters, and mixtures thereof.

Other additives can be included in the initial monomer solution in order to modify the gel properties of the gelcasting composition. Examples of suitable additives include: plasticizers to modify the mechanical properties of the gel in the wet and dry states; electrolytes; defoamers; bactericides; fungicides; soluble functional polymers; inorganic particles or fibers; organic particles or fibers. Soluble functional polymers are any polymeric species that are added to the gel or to the gel precursor to modify the properties of the gel or the gel precursor. These might include emulsifiers, dispersants, thickeners, polyelectrolytes, chelating agents, foaming agents, and suspending agents.

The level of additive used in a particular gelcasting application can vary widely. It will depend directly on the role that the additive is playing in the gelcasting system. In general, additive levels will vary from parts per million to tens of percent by weight. For example, one might add a plasticizer to the monomer solution to provide a more compliant polymer in the gelled and dried state. The plasticizer content would be on the order of several percent of the weight of the dried hydrogel. A bactericide can be added to the monomer solution to prevent growth of bacteria during storage. This would be added at a parts per million level.

Foam control agents are added to gelcasting suspensions to either remove bubbles or form bubbles in the suspension. Foam control agents are typically added at from about 0.01 to about 2 wt. % of the suspension. If one is trying to make low density materials, then foaming agents can be added to the gelcasting suspension to form bubbles and thus lower the density of the gelled part. Alternatively, if one is trying to make a high density part, defoamers are added to the suspension to help break up any bubbles that might form. In addition, the suspension might be placed under vacuum to accelerate the removal of bubbles from the suspension.

The inorganic powder, the monomer solution and the plasticizer may be combined in any suitable manner. In a preferred embodiment, the slurry mixture is formed by dissolving the dispersant in the monomer solution then adding the inorganic powder to the solution, followed by adding an initiator to the slurry. The resultant slurry mixture is formed into a desired shape and heated for a temperature and for a time sufficient for the HMAM monomer and any comonomer to polymerize and gel to form a firm polymer-solvent gel matrix.

The exact temperature at which the polymerization occurs depends on the particular initiator compound, and the particular comonomers which are included in the monomer solution. The polymerization reaction is preferably accomplished at temperatures between the freezing point and the boiling point of the solvent system being used. The free-radical initiator is activated by heating, and a temperature of about 50° C. is useful for many systems. Generally, polymerization temperatures of between about 1° C. and about 100° C. are preferred, and temperatures of between about 15° C. and about 80° C. are most preferred.

The gel time necessary to form a firm polymer-solvent gel matrix is dependent on the particular monomers, solvent and initiator compound. Generally, the slurry mixture should be heated for at least about 1 minute, and preferably is heated for a period of from about 1 to about 120 minutes in order to polymerize the monomers and form the firm polymer-solvent gel matrix.

The gel can be formed under vacuum, or at pressures greater than atmospheric, and as high as about 300 psi. The reaction can be carried out at atmospheric pressure, although other pressures can be utilized to produce hydrogels having different properties. A hydrogel foam can be produced by providing a saturated monomer solution under pressures of about 1 to about 20 atmospheres. A gas such as $CO_2$ or air can be pumped into the monomer solution, and the solution can then be heated. The pressure of the solution is dropped and the gelation reaction is carried out to produce a hydrogel foam. The gelation reaction can also be performed at pressures up to about 20 atmospheres.

After heating, the resultant shaped, solid product may be cooled to ambient temperature. The product is in a wet, green condition in that it contains solvent and it is in the unsintered form. The green product may subsequently be heated in order to substantially remove the organic solvent to provide a dry product. The specific temperature and time necessary for drying the product depends on the specific inorganic powder and monomer employed. Initially, drying should be conducted at a temperature such that evaporation is not too rapid. Consequently, the drying temperature will typically be closer to the melting point than to the boiling point of the solvent. As the drying process proceeds, the temperature may be raised to provide faster drying rates. Finally, to drive off the last traces of solvent from the gelcast part may require temperatures in excess of the boiling point of water. In general, drying will require times of at least one hour and may require times up to about 30 hours. Additionally, the polymer may be substantially removed from the product by further heating at a higher temperature, for example, greater than about 300° C. Finally, the solid, shaped product may be sintered to form a high density body. Sintering temperatures for various ceramic powders are well known in the art. Alternatively, substantial removal of the polymer may be accomplished as a low temperature step of the sintering process.

While casting into a formed mold is preferred for the method of the present invention, other molding techniques, including extrusion molding, or solid free form fabrication may also be employed. Moreover, any conventional additives known in the ceramic processing arts, for example, mold release agents, may be included in the slurry mixtures for their known functions.

The invention provides a new gelcasting composition which is comprised of polymerized hydroxymethylacrylamide in water, an inorganic powder, and without the presence of a cross-linking agent. One or more comonomers can be polymerized with the HMAM, and one or more initiators can be present. One or more additives can be included to alter the properties of the gelcasting composition that is produced.

The methods of the invention were demonstrated in a series of experiments. The following examples demonstrate the viability of the invention to make gelcasting compositions without the use of cross-linking agents.

EXAMPLE 1

HMAM Trial

A solution containing 15 wt % HMAM was made in water. Ammonium persulfate (APS) solution (10% by wt in water) and tetramethylethylenediamine (TEMED) were added to initiate the polymerization reaction at levels of 2.5 $\mu$l 10 wt % APS in water and 0.25 $\mu$l TEMED per gram of HMAM solution. The solution was poured into a 50 ml test cup. The sample was heated to 50° C. for 15 min. The resulting sample was a firm gel. Similar results were obtained using solutions containing 5, 10, and 20 wt % HMAM, except that the gels were somewhat weaker at the lower monomer concentrations (5 and 10 wt %) and somewhat stronger at the higher concentration (20 wt %).

EXAMPLE 2

Range of Gel Formulation Using Comonomers

Table 1 (FIG. 1) lists 66 comonomer compositions that were tested for gel formation at concentrations ranging from 1 wt % to 75 wt % total monomer in water solution and at comonomer-to-HMAM ratios ranging from 0:1 to 10:1. The initiator concentration was the same in all cases, and was 0.5 wt % of a 10 wt % aqueous ammonium persulfate solution and 0.05 wt % addition of TEMED. Comonomer weights are based on the weight of pure chemical. HMAM weights are based on a 48 wt % solution in water. Table 1 also shows that gels can be synthesized under vacuum as well as at ambient pressure.

EXAMPLE 3

Gel Formation Using More Than One Comonomer

Table 2 (FIG. 2) lists 6 compositions that were tested for gel formation in which two comonomers were used. The initiator concentration was the same in all cases. The initiator level was a 0.5 wt % addition of a 10 wt % aqueous ammonium persulfate solution and a 0.05 wt % addition of TEMED. The lack of gel formation in sample 70 can be corrected by increasing the amount of initiator.

EXAMPLE 4

Gelcasting With HMAM

A slurry was made using the monomer solution of Example 1 (i.e., 20 wt % HMAM) in water. The slurry was comprised of 55 vol % alumina (RC HP DBM, Malakroft Industries), 0.5 wt % addition Darvan 821A (R. T. Vanderbilt Corp.), and 45 vol % HMAM solution. Ammonium persulfate (APS) solution (10 % by wt in water) and tetramethylethylenediamine (TEMED) were added to initiate the polymerization reaction at levels of 0.5 $\mu$l 10 wt % APS in water and 0.05 $\mu$l TEMED per gram of slurry. The slurry was poured into a test mold. The sample was heated to 50° C. for 15 min. The resulting gelled part was exceptionally rigid. The part was removed from the mold prior to drying. It was observed that the HMAM part released much more easily from the mold than did similar parts made using conventional methacrylamide—methylene bisacrylamide (MAM-MBAM) gelcasting system. This represents a major improvement in the performance of the gelcasting system, as the release from the mold is often the determining factor in whether or not gelcasting can be used to make a particular part.

EXAMPLE 5

Gelcasting With HMAM-MAM, #1

A slurry was made using a monomer solution consisting of 10 wt % HMAM and 10 wt % MAM in water. The slurry was comprised of 55 vol % alumina (RC-HP DBM, Malakroft Industries), 0.5 wt % addition Darvan 821A (R. T. Vanderbilt Corp.), and 45 vol % HMAM MAM solution. Ammonium persulfate (APS) solution (10% by wt in water) and tetramethylethylenediamine (TEMED) were added to initiate the polymerization reaction at levels of 0.5 $\mu$l 10 wt % APS in water and 0.05 $\mu$l TEMED per gram of slurry. The slurry was poured into a test mold. The sample was heated to 50° C. for 15 min. The resulting gelled part was exceptionally rigid. The 1:1 HMAM-MAM copolymer gel part released much more easily from the mold than did similar parts made using the standard methacrylamide methylene bisacrylamide (MAM-MBAM) gelcasting system.

EXAMPLE 6

Gelcasting With HMAM-MAM, #2

A slurry was made using a monomer solution consisting of 12.67 wt % HMAM and 6.33 wt % MAM in water. The slurry was comprised of 55 vol % alumina (RC-HP DBM, Malakroft Industries), 0.5 wt % addition Darvan 821A (R. T. Vanderbilt Corp.), and 45 vol % HMAM-MAM solution. Ammonium persulfate (APS) solution (10% by wt in water) and tetramethylethylenediamine (TEMED) were added to initiate the polymerization reaction at levels of 0.5 $\mu$l 10 wt % APS in water and 0.05 $\mu$l TEMED per gram of slurry. The slurry was poured into a test mold. The sample was heated to 50° C. for 15 min. The resulting gelled part was exceptionally rigid. The 2:1 HMAM-MAM copolymer gel part released much more easily from the mold than did similar parts made using the standard methacrylamide methylene bisacrylamide (MAM-MBAM) gelcasting system.

The use of HMAM alone (Example 4) produces an effective gelcasting composition. It can be also be seen that HMAM-comonomer blends, and particularly HMAM-MAM blends, produce good gelcasting compositions without the presence of a cross-linking agent.

The properties of HMAM-comonomer gelcasting compositions will change as the comonomer to HMAM ratio changes. It is believed that HMAM gels form by hydrogen bonding between the OH groups on the HMAM molecules. As the number of HMAM units in a gel decreases (the comonomer to HMAM ratio increases) the number of hydrogen bonds will decrease accordingly. If no comonomer is present, each monomer unit in the polymer chain is an HMAM unit and is available to form a hydrogen bond through the hydroxyl group (OH) of the molecule. The MAM monomer has no OH-group through which a crosslink can be formed. If the ratio of comonomer to HMAM is increased from 0:1 to 5:1, only one in five of the monomer units in the polymer chain is available to form hydrogen bonds. If the ratio is increased still farther to 10:1, the percentage of monomer units in the polymer chain available to form hydrogen bonds decreases. The crosslinked structure becomes more open and more flexible as the comonomer to HMAM ratio increases from 0:1 to 10:1. As the gel becomes more open, the strength and the stiffness of the gel will decrease. Eventually, at very high comonomer to HMAM ratios, the probability of forming hydrogen bonds drops so low that no gel is formed. At that point, only a viscous polymer solution is formed.

The following properties/characteristics of gelcast compositions constructed in accordance with the present invention were evaluated: (1) mold releasability; (2) dispersion and loading of solids; and (3) machininability of gelcast bodies in an unfired, or unsintered, state (i.e., in a "green" state). The results were compared to similar data collected using conventional gelcast compositions.

EXAMPLE 7

Mold Release Characteristics

The releasability of unfired gel castings from molds is a crucial factor in preparing intact gelcast parts. As mold releasability increases, the potential for damaging a gelcast body during release from the mold decreases. Visual inspection of released parts for surface defects is the most accurate and efficient means for evaluating and comparing mold releasability of gelcast parts.

In this instance, releasability was evaluated using a conventional test plate mold having a ribbed mold cavity surface. The ribbed portions of the test mold create thin fragile mold body portions. The likelihood for tearing of these ribbed body portions increases as releasability of the body from the mold decreases. An HMAM monomer system in accordance with the present invention was compared with two conventional monomer systems. All three systems were identically loaded with aluminum oxide powder. In particular, aqueous-based slurries of aluminum oxide were prepared at 55 volume percent loading and 0.5 percent dispersant. The three monomer systems evaluated were: (1) 15% MAM/MBAM (6:1); (2) 15% MAM/PEGDMA (3:1); and (3) 15% HMAM. Identical anodized aluminum molds were coated with a polyester parfilm mold release spray before the respective slurries were cast. The parts were polymerized, removed from the respective molds, and visually inspected for surface defects. The result were as follows:

(1) 15% HMAM—gelcast body released intact with no signs of tearing along any of the ribbed portions;

(2) MAM/MBAM (6:1)—gelcast body was severely torn along virtually all of the ribs and other body portions;

(3) MAM/PEGDMA (3:1)—gelcast body was partially torn (along one rib for approximately one-third of the rib's length).

The experiment was repeated using a second commercially available mold release material (AZN Mold Wiz). In the second trial, the 15% HMAM cast was, once again, removed fully intact; the MAM/MBAM (6:1) cast was torn along two sets of ribs and across a center body section; and the MAM/PEGDMA (3:1) cast was torn along one rib for approximately one-third of the rib's length.

The results illustrate the improved mold releasability of HMAM-based gelcasting bodies having compositions in accordance with the present invention.

EXAMPLE 8

Loading Characteristics

The loading and dispersion characteristics of solid filler particles (i.e., ceramic powder) in the monomer system affect the structural integrity of the formed gelcast part. Generally, increased loading and dispersion result in improved structural integrity of the casting in an unfired state, and reduced casting shrinkage upon firing/sintering. There is a direct relationship between loading and dispersion. Specifically, improved dispersion of a solid filler in a particular monomer system results in increased maximum filler loading. The percentage of solid filler loading that can be achieved for a particular system is limited by the ability to subsequently transfer the slurry into a mold. In general, it is desirble to maximize solids loading while maintaining the slurry in a flowable state. Consequently, it is not desirable to increase solids loading if the increased loading results in a slurry too viscous to be transferred into a mold and subseqently de-aired. As used herein, the term "maximum solids loading" is defined as the maximum filler content that can be achieved without compromising the ability to mold an intact part.

The loading and dispersion limits of a typical ceramic filler in a conventional monomer system were compared with loading and dispersion limits of identical ceramic filler in a monomer system made in accordance with the present invention. Specifically, aqueous gelcast slurries were prepared using zinc oxide (ZnO) ceramic powder constituent. A slurry incorporating an HMAM monomer system in accordance with the present invention manifested significantly better dispersion and loading characteristics than a similar slurry comprising a conventional monomer system. Maximum solids loading of 50 volume percent was achieved in a system incorporating HMAM as the sole monomer. In comparison, a conventional monomer/crosslinker system comprising MAM/PEGDMA achieved a maximum ZnO loading of 45 volume percent. Daxad 30 was used as the dispersant in both systems.

Trial 1: 45 vol. % ZnO in MAM/PEGDMA monomer system. 54.50 g monomer (15 wt % MAM/PEGDMA in water); 2.5 g Daxad 30; and 250 g ZnO. Result: Suspension suitable for casting.

Trial 2: 50 vol. % ZnO in MAM/PEGDMA monomer system. 44.64 g monomer (15 wt % MAM/PEGDMA in water); 2.5 g Daxad 30; and 250 g ZnO. Result: Suspension unsuitable for casting.

Trial 3: 45 vol. % ZnO in HMAM monomer system. 54.50 g monomer (15 wt % HMAM in water); 2.5 g Daxad 30; and 250 g ZnO. Result: Suspension suitable for casting.

Trial 4: 50 vol. % ZnO in HMAM monomer system. 44.64 g monomer (20 wt % HMAM in water); 2.5 g Daxad 30; and 250 g ZnO. Result: Suspension suitable for casting.

EXAMPLE 9

Dispersion Characteristics

Dispersion of two ceramic fillers were evaluated in a monomer system having a composition in accordance with the present invention. Improvements in filler dispersion, relative to dispersion in conventional systems, were characterized in terms of increased maximum filler loading. In other words, increases in maximum filler loading can be directly attributed to improved dispersion characteristics of the particular monomer system.

(a) In prior gelcasting evaluations, limited dispersion/loading of Hydroxyapatite (HA) resulted in inadequate sintered part density. As a general rule, a minimum inorganic powder loading of approximately 40 volume percent is needed to produce a gelcast part capable of being effectively machined and sintered. In conventional gelcasting systems, maximum HA loading is limited to about 38 volume percent. Historically, limited HA loading in conventional monomer systems has precluded the formation of gelcast bodies having compositions incorporating HA filler.

Gelcast compositions formulated in accordance with the present invention resulted in increased dispersion of Hydroxyapatite (HA). In particular, a slurry comprising a commercially-available HA filler (Roune-Poulenc) in an HMAM/water monomer system achieved a maximum filler loading of 55 volume percent. Additional components of the system included Darvan 821-A dispersant and 10 wt % AZIP (2,2'-Azobis[2-(2-imidazolin-2-yl)propane] dihydrochloride)/water initiator solution. The slurry was poured into a mold, fully de-aired, and then heated to 50° C. for 45 minutes. The resulting gelcast part was very firm and, upon release from the mold, did not exhibit any surface defects.

(b) Historically, gelcast slurries comprising Zirconia (Tosoh TZ-8YS) filler in conventional monomer systems, such as MAM/PEG, have also proven difficult to gelcast. In conventional systems, maximum Zirconia solids loading is typically limited to about 35 volume percent. As a result, gelcast parts incorporating zirconia filler have yielding inadequate unsintered (i.e., green state) and sintered part densities. Furthermore, high slurry viscosity has precluded mold filling for complex or thin-walled castings.

Using an HMAM/water monomer system in accordance with the present invention, a maximum Zirconia filler loading of 45 volume percent was achieved. The system also included a polymerization initiator (10% AZIP in water). The slurry was poured into a test mold, fully de-aired, and then heated at 50° C. for 45 minutes. The resulting gelcast part was very firm and exhibited excellent mold releasability. The post-sintered part had a theoretical density of greater that 99%. This represents a significant improvement in the gelcasting of zirconia parts, especially those having thin-walled and/or complex shapes.

EXAMPLE 10

Machinability of Unsintered ("Green") Parts

Upon release from the mold, but prior to sintering, gelcast parts are typically machined to achieve desired geometries and structural features. Wall thickness testing is one method of evaluating machinability characteristics. Wall thickness testing comprises drilling a series of parallel channels in an unsintered test plate having a particular gelcast composition. A drill bit having a specified diameter is used to successively drill the parallel channels. The space between adjacent channels is gradually decreased. As a result, the wall thickness separating adjacent channels is gradually decreased. Multiple passes are made to gradually increase the depth of the channels. As the machinability of a given composition improves, the minimum wall thickness that can be achieved between adjacent channels in the plate decreases.

Wall thickness tests were performed to evaluate the machinability of HMAM-based gelcast parts relative to the machinability of parts made using a conventional MAM/PEGDMA monomer system. The results (summarized in FIG. 3) suggest that the machinability of HMAM-based parts is comparable to, and in some instances slightly better than, parts constructed using the conventional monomer system. The parameters for the wall thickness testing were as follows:

Plunge rate=2 in/min

Feed rate=10 in/min

Spindle speed=9000 rpm

Acceleration=10 (on a relative scale)

Passes=4 passes of 0.03 inches to a total depth of 0.120 inches

Tool Bit: 1 mm diameter flat head Tungsten Carbide coated dental bit

Wall Thickness Increments: 0.040 inches to 0.002 inches

Referring to FIG. 3, column 1-3 represent the composition and concentration levels of ceramic filler, monomer system and system additives, respectively. Column 4 represents the minimum non-deformed wall thickness achieved. Column 5 represents the minimum wall thickness achieved with minimal deformation, such as minor chipping.

Gelcasting compositions made according to the invention can be used in a variety of different uses known for gelcasting. The invention is capable of taking on alternative embodiments without departing from the spirit or essential attributes thereof, and accordingly, reference should be had to the following claims, rather than to the foregoing specification, as indicating the scope of the invention.

We claim:

1. A method for forming a gelcast body having at least one ribbed body portion, comprising the steps of:
   (a) making a mixture comprising inorganic powder, an aqueous monomer solution including hydroxymethylacrylamide (HMAM), and an initiator, said mixture absent a cross-linking agent;
   (b) introducing said mixture into a mold;
   (c) reacting said monomers to polymerize them to form a firm polymer-solvent gel matrix;
   (d) releasing said gel matrix from said mold; and,
   (e) maintaining the integrity of the at least one ribbed body portion to the gelcast body during said releasing step.

2. A method as recited in claim 1, wherein said inorganic powder is aluminum oxide.

3. A method as recited in claim 2, wherein said aluminum oxide powder comprises between about 50 volume percent and about 55 volume percent of said mixture.

4. A method as recited in claim 2, wherein said aluminum oxide powder comprises at least about 55 volume percent of said mixture.

5. A method as recited in claim 1, wherein said inorganic powder is silicon nitride.

6. A method as recited in claim 5, wherein said silicon nitride comprises between about 50 volume percent and about 55 volume percent of said mixture.

7. A method as recited in claim 5, wherein said silicon nitride comprises at least about 55 volume percent of said mixture.

8. A method for forming a gelcast body, comprising the steps of:
   (a) making a mixture comprising inorganic powder, an aqueous monomer solution including hydroxymethylacrylamide (HMAM), an initiator and a dispersant, said mixture absent a cross-linking agent;
   (b) transferring the mixture into a mold;
   (c) reacting said monomers to polymerize them to form a firm polymer-solvent gel matrix, the gelcast body having a survival thickness between 3 and 10 mils; and,
   (d) machining the gelcast body.

9. A method as recited in claim 8, wherein said inorganic powder is zinc oxide.

10. A method as recited in claim 9, wherein said zinc oxide comprises at least 50 volume percent of said mixture.

11. A method as recited in claim 8, wherein said inorganic powder is hydroxyapatite.

12. A method as recited in claim 11, wherein said hydroxyapatite comprises between about 40 volume percent and about 55 volume percent of said mixture.

13. A method as recited in claim 11, wherein said hydroxyapatite comprises at least about 55 volume percent of said mixture.

14. A method as recited in claim 8, wherein said inorganic powder is zirconium oxide.

15. A method as recited in claim 14, wherein said zirconium oxide comprises between about 35 volume percent and 45 volume percent of said mixture.

16. A method as recited in claim 14, wherein said zirconium oxide comprises at least about 45 volume percent of said mixture.

* * * * *